US00RE50956E

(19) United States
(12) Reissued Patent
Cai et al.

(10) Patent Number: US RE50,956 E
(45) Date of Reissued Patent: Jul. 21, 2026

(54) BED COVER OF PICKUP TRUCK

(71) Applicant: WENZHOU CHAOMING AUTO PARTS CO., LTD, Zhejiang (CN)

(72) Inventors: Lanhua Cai, Wenzhou (CN); Yi Lin, Wenzhou (CN)

(73) Assignee: Wenzhou Chaoming Auto Parts Co., Ltd., Zhejiang (CN)

(21) Appl. No.: 18/385,777

(22) Filed: Oct. 31, 2023

Related U.S. Patent Documents

Reissue of:
(64) Patent No.: 11,021,047
Issued: Jun. 1, 2021
Appl. No.: 16/517,472
Filed: Jul. 19, 2019

(30) Foreign Application Priority Data

Jun. 3, 2019 (CN) ..... 201910477424.X

(51) Int. Cl.
*B60J 7/14* (2006.01)
*B60P 7/02* (2006.01)

(52) U.S. Cl.
CPC ..... *B60J 7/141* (2013.01); *B60P 7/02* (2013.01)

(58) Field of Classification Search
CPC ..... B60P 7/02; B60J 7/141
See application file for complete search history.

(56) References Cited

U.S. PATENT DOCUMENTS 4,844,531 A * 7/1989 Kooiker ..... B60J 7/041 296/100.09
5,427,428 A * 6/1995 Ericson ..... B60J 7/141 160/231.1
5,653,491 A * 8/1997 Steffens ..... B60J 7/141 160/187
5,931,521 A * 8/1999 Kooiker ..... B60J 7/141 296/100.09
6,076,881 A * 6/2000 Tucker ..... B60J 7/141 296/100.07
6,352,296 B1 * 3/2002 Kooiker ..... B60J 7/141 296/100.06
8,348,328 B2 * 1/2013 Walser ..... E05D 7/009 296/100.09
9,004,571 B1 * 4/2015 Bernardo ..... B60J 7/141 296/100.03
9,643,479 B1 * 5/2017 Zheng ..... B60J 7/141
(Continued)

FOREIGN PATENT DOCUMENTS

CN 205292241 U 6/2016
CN 208881559 U 5/2019
(Continued)

*Primary Examiner* — William E Dondero

(74) *Attorney, Agent, or Firm* — Crowell & Moring LLP

(57) ABSTRACT

This invention is relevant to a bed cover of pickup truck. The bed cover of pickup truck includes one bed cover. The bed cover includes at least two plates. The adjacent plates are connected by rotating shaft structure. The rotating shaft structure includes a plate-like pedestal, two connectors which form a rotary connection with the pedestal. This invention provides a bed cover of pickup truck with simple structure and great leading function. The drainage channel in the invention are big and will not cause syphonage. Thus the leading function will be better, requirement of the assembly accuracy will be lower and the production will be easier.

10 Claims, 13 Drawing Sheets

(56) References Cited

U.S. PATENT DOCUMENTS

| | | | | |
|---|---|---|---|---|
| 9,895,963 | B1 * | 2/2018 | Spencer | B60J 7/141 |
| 10,471,814 | B1 * | 11/2019 | Weng | B60P 7/02 |
| 2005/0029832 | A1 * | 2/2005 | Verduci | B60J 7/1621 296/100.06 |
| 2007/0024079 | A1 * | 2/2007 | Wheatley | B60J 7/061 296/100.16 |
| 2007/0108792 | A1 * | 5/2007 | Weldy | B60J 7/198 296/100.09 |
| 2008/0100088 | A1 * | 5/2008 | Calder | B60J 7/141 296/100.09 |
| 2009/0146449 | A1 * | 6/2009 | Steffens | B60J 7/141 296/100.07 |
| 2011/0175375 | A1 * | 7/2011 | Terhaar | E05B 79/20 292/220 |
| 2013/0015678 | A1 * | 1/2013 | Williamson | E05C 19/10 296/100.09 |
| 2013/0106133 | A1 | 5/2013 | Maimin et al. | |
| 2015/0054300 | A1 * | 2/2015 | Shi | B60R 11/00 296/100.09 |
| 2015/0061315 | A1 * | 3/2015 | Facchinello | B60P 7/02 296/100.07 |
| 2015/0130211 | A1 * | 5/2015 | Parshall | B60P 7/02 296/100.05 |
| 2016/0031305 | A1 * | 2/2016 | Bernardo | B60J 7/085 296/100.03 |
| 2017/0120736 | A1 * | 5/2017 | Lutzka | B60J 7/141 |
| 2017/0197498 | A1 * | 7/2017 | Facchinello | B60J 7/106 |
| 2017/0217294 | A1 * | 8/2017 | Lutzka | B60J 7/141 |
| 2017/0259655 | A1 * | 9/2017 | Dylewski, II | B60J 7/198 |
| 2017/0361692 | A1 * | 12/2017 | Corder | E05C 3/16 |
| 2018/0093555 | A1 * | 4/2018 | Aubrey | B60P 7/06 |
| 2018/0147926 | A1 * | 5/2018 | Shi | B60J 7/198 |
| 2018/0312049 | A1 * | 11/2018 | Slinger | B60J 10/30 |
| 2019/0100088 | A1 * | 4/2019 | Facchinello | B60J 10/00 |
| 2019/0291550 | A1 * | 9/2019 | Ma | B60P 7/02 |
| 2019/0291553 | A1 * | 9/2019 | Ma | B60J 7/141 |
| 2019/0291554 | A1 * | 9/2019 | Ma | B60J 7/1607 |
| 2019/0308494 | A1 * | 10/2019 | Aubrey | B60P 7/06 |
| 2019/0315209 | A1 * | 10/2019 | Lewis | B60J 7/104 |
| 2020/0094660 | A1 * | 3/2020 | Ma | B60J 7/185 |
| 2020/0108702 | A1 * | 4/2020 | Dylweski, II | B60J 7/141 |
| 2020/0130492 | A1 * | 4/2020 | Kim | B60J 11/025 |
| 2020/0254860 | A1 * | 8/2020 | Lutzka | B60J 7/185 |
| 2021/0061078 | A1 * | 3/2021 | Cai | B60J 7/198 |
| 2021/0061079 | A1 * | 3/2021 | Sun | B60J 7/141 |

FOREIGN PATENT DOCUMENTS

| | | | | |
|---|---|---|---|---|
| CN | 110481292 A | * | 11/2019 | B60J 7/1607 |
| CN | 110539622 A | * | 12/2019 | B60J 7/141 |
| CN | 110481292 B | * | 12/2020 | B60J 7/198 |
| CN | 110539622 B | * | 12/2020 | B60J 7/198 |

* cited by examiner

BED COVER OF PICKUP TRUCK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority to Chinese Patent Application No. 201910477424.X with a filing date of Jun. 3, 2019. The content of the aforementioned application, including any intervening amendments thereto, are incorporated herein by reference.

Technical Field

This invention is relevant to mechanical field, especially about the bed cover of pickup truck.

Background Technology

Pickup truck is a car with cab and an open truck compartment. With its comfortable interior environment, charming appearance, strong power, low price and the practicability of both passenger-cargo purpose, pickup truck meets the need of people from all walks of life.

However, pickup trucks have open bed and often need a cover for shelter to prevent the goods in it from sunshine and rain. For example, U.S. Pat. No. 7,484,788 B2 discloses a kind of pickup truck bed cover whose disadvantage is that water will seep into the inside of the rotating shaft in the transfer part. Thus it will result in the need for additional waterproof strips in the transfer part. The installation of waterproof strips is complex and the stability is poor. When water seeps into the inside of the rotating shaft, all the water in the rotating shaft can not be leaked due to the position of the outlet hole on the socket. And the installation hole on the socket destroys the overall makes the bed cover not so beautiful.

ABOUT THE INVENTION

The purpose of the invention is to provide a kind of pickup truck bed cover and solve at least one technical problem above.

Thus the invention use the following method:

The bed cover of pickup truck includes one bed cover. Its features are that the bed cover include at least two plates. The adjacent plates are connected by rotating shaft structure.

The rotating shaft structure includes a plate-like pedestal, two connectors which form a rotary connection with the pedestal.

There is a first rotating part on both sides of the pedestal, the lower *inner* surface of which is [cambered] *concave*. There is a rotary groove whose cross section is major arc shape in the above part of the first rotary part. And there exists the first stop bar in the inner rotary groove which is close to the connectors.

One side of the connectors is connected with the plates, and there is the first groove which matches with the first rotating part in the another side of the connector. And there is the second stop bar which is hook shape in the above part of the first groove. And there is the front part of the second stop bar in the rotary groove.

At least two of the plates are made of FRP Honeycomb Panel. The rotating shaft structure is made of plastic.

The pedestal and the first rotating part, the first rotating part and the first blocking strip all adopt the integrated structure. And the connectors and the second stop bar adopt the integrated structure. The bottom surface of the first groove is arc-shaped to match the lower surface of the first rotating part, which is more smooth when deflected.

One side of the connectors are provided with the first embedded slot. And the one side of the plate is embedded into the slot. So the above connector is is fixedly connected with the plates. The cross section of the first embedded slot is ⊔ shape. The cross section of the first embedded slot is ⊔ shape. And the first embedded slot is provided with at least two opposite first strip convex. The length direction of first convex is the same as that of the connector.

There are 3 plates in the bed cover of pickup truck. The 3 plates include the first plate, the second plate and the third plate. The first and the second plate are connected by the first rotating shaft structure. And the second and the third plate are connected by the second rotating shaft structure.

The first rotating shaft structure [consists of] *comprises* the first pedestal. The second rotating shaft structure [consists of] *comprises* the second pedestal. And the width of first pedestal close to the pickup truck head is larger than that of second pedestal close to the rear of pickup truck.

The sidebar is set in the outside part of the plates to protect the side of the plates. And there is the second embedded slot for the plates set in one side of the sidebar. The first insert slot is arranged on both ends of the sidebars. The cross section of the second embedded slot is in the shape of ⊏. The second embedded slot is provided with at least two opposite arranged second strip convex. And the length direction of the second strip convex is the same as the length direction of the sidebar.

There is a corner socket set in the corner of the plates to connect the adjacent sidebars. And the two ends of the corner socket are provided with a first plug for inserting into the first insert slot.

There is a rotating shaft socket set in outside part of the rotating shaft structure to protect the structure. The rotating shaft socket contains one first socket installed in the outside part of the pedestal and two second socket installed in the connectors;

There is the second rotating part on both sides of the first socket. And the lower surface of the second rotating part is arc-shaped. The upper side of the second rotating part is provided with a drainage channel connected with the rotating groove;

One side of the second socket is fixedly connected with the sidebar. And the another side of the second socket is provided with a second groove matching the shape of the second rotating part. The second rotating part is arranged in the second groove.

With an opening on one side of the second groove as a drainage port, the width of the second groove is less than that of the second socket.

The upper part of the first socket is provided with the first sheet-shaped convex to cover the pedestal. And the upper part of the second socket is provided with the second sheet-shaped convex to cover the connector.

The second plug for inserting into the first insert slot is arranged on one side of the second socket, and then one side of the second socket is fixedly connected with the side bar.

A second insert slot is arranged on the pedestal and the connector. And a third plug for inserting the second insert slot is arranged on the upper part of the first and second socket. A first thread bolt hole is arranged on the pedestal and the connector. A second thread bolt hole matching the position of the first thread bolt hole is arranged on the first and the second socket. Then the pedestal is fixed with the first socket, the connector part and the second socket by thread bolts.

A wrench is arranged below the plate. The wrench comprises a lower plate and an upper plate fixed to the lower plate. And the lower part of the lower plate works as a handle of the wrench.

The upper part of the lower plate is provided with an installation groove. The upper plate is arranged outside the installation groove. A spring and a bolt are arranged in the installation groove. The bolt is arranged above the spring. The upper plate is provided with a clamp groove for clamping the bolt.

The upper part of the lower plate is provided with two connecting arms. A lifting block and a hook are arranged between the two connecting arms. A lifting block and a hook is arranged on one side of the lifting block. The lifting block is arranged above the bolt. The lifting block is provided with a thread hole through which a threaded rod passes. One side of the thread rod is arranged in the thread hole. The another side of the rod is fixed on the plate.

When the handle is rotated clockwise, the hook will move upward along the lifting block so that the groove part of the hook can be against the sidebar of the pickup truck body. And the bolt will be clamped into the groove on the upper plate to fix the bed cover to the pickup bed.

Press the bolt and draw it out from the groove. Then rotate the handle counterclockwise, the hook will move downward along the lifting block to remove the cover of the pickup truck from the pickup truck bed.

By this design, this invention provide a kind of bed cover of pickup truck with simple structure. When the bed cover is in use and the water falls to the cover, it will penetrate into the rotary groove along the clearance between connectors and the pedestal. The rotary groove is like a drainage channel with great leading function. The rotating shaft structure can stop the water from penetrating into the bed cover of pickup truck, meanwhile the water can't penetrate into the inside part of pedestal in rotating shaft structure. Comparing with other drainage structures, the drainage channel in the invention are bigger and will not cause syphonage. Thus the leading function will be better, requirement of the assembly accuracy will be lower and the production will be easier.

THE CONCRETE METHOD TO CARRY OUT

The following instruction is to further explain t the concrete implementation method of the invention.

Figure 1:
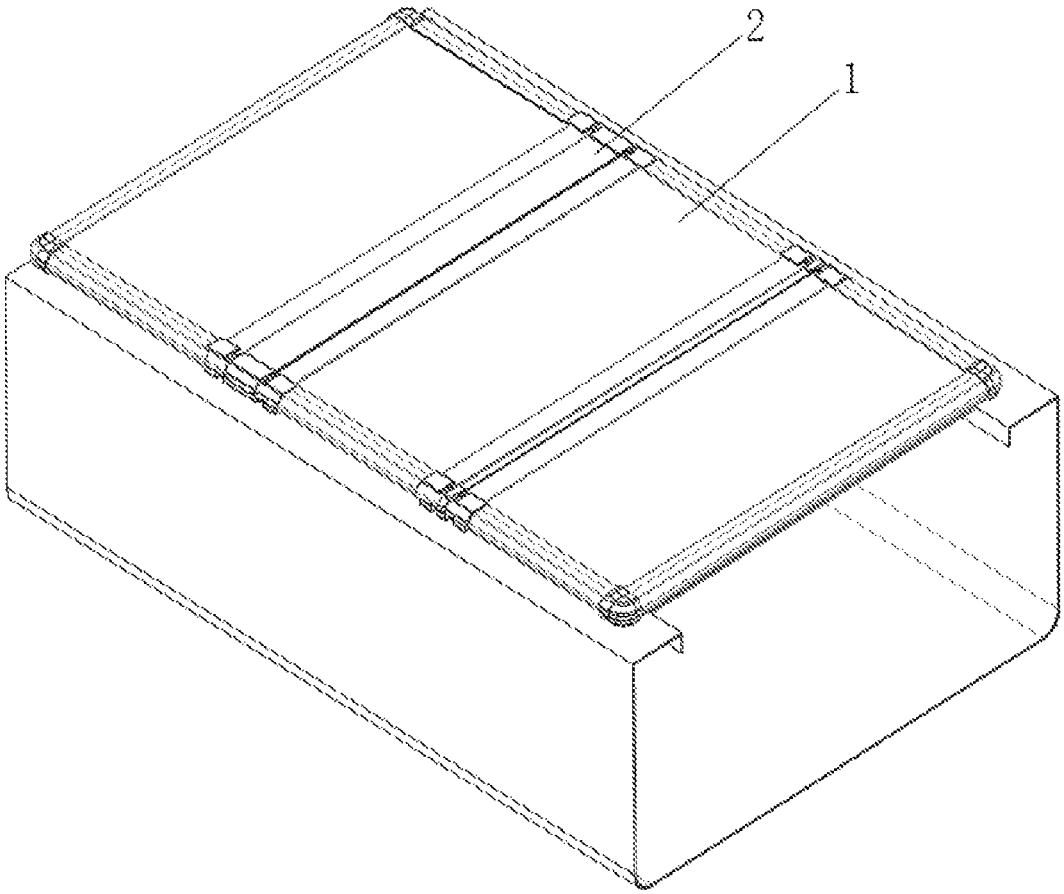
FIG. 1 is a partial structure illustration of the invention.
Figure 2:
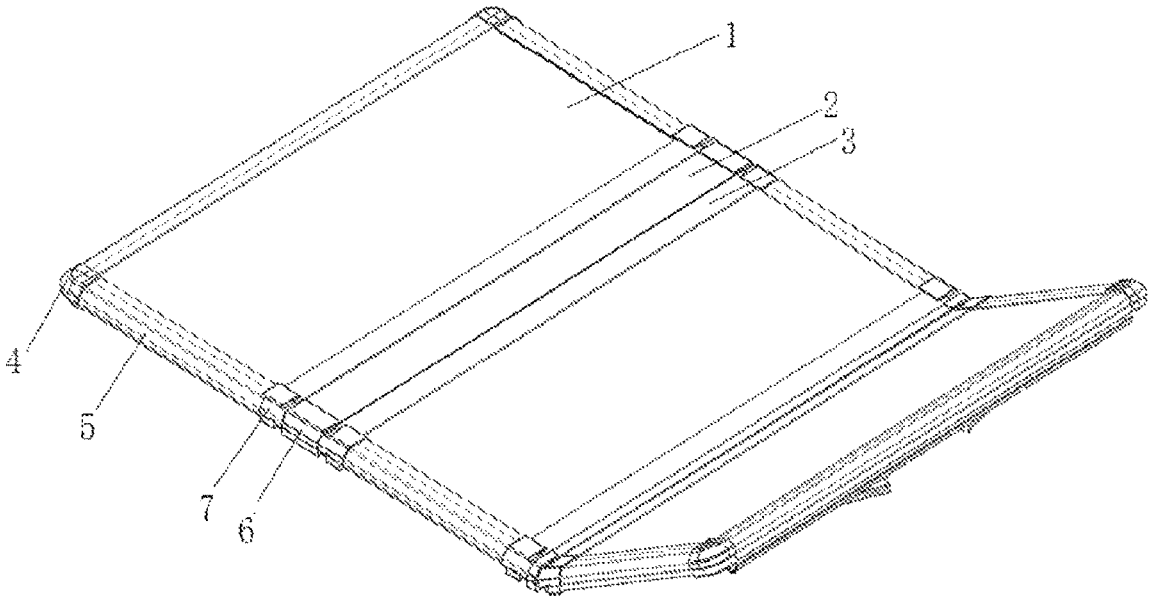
FIG. 2 is a partial structure illustration of the invention when the plate is turned up.
Figure 3:
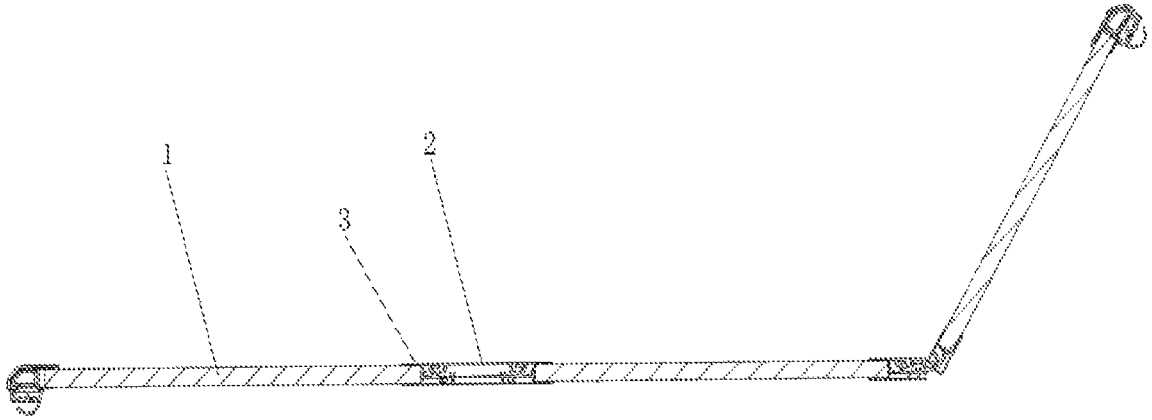
FIG. 3 is a partial structure section illustration of the invention.
Figure 4:
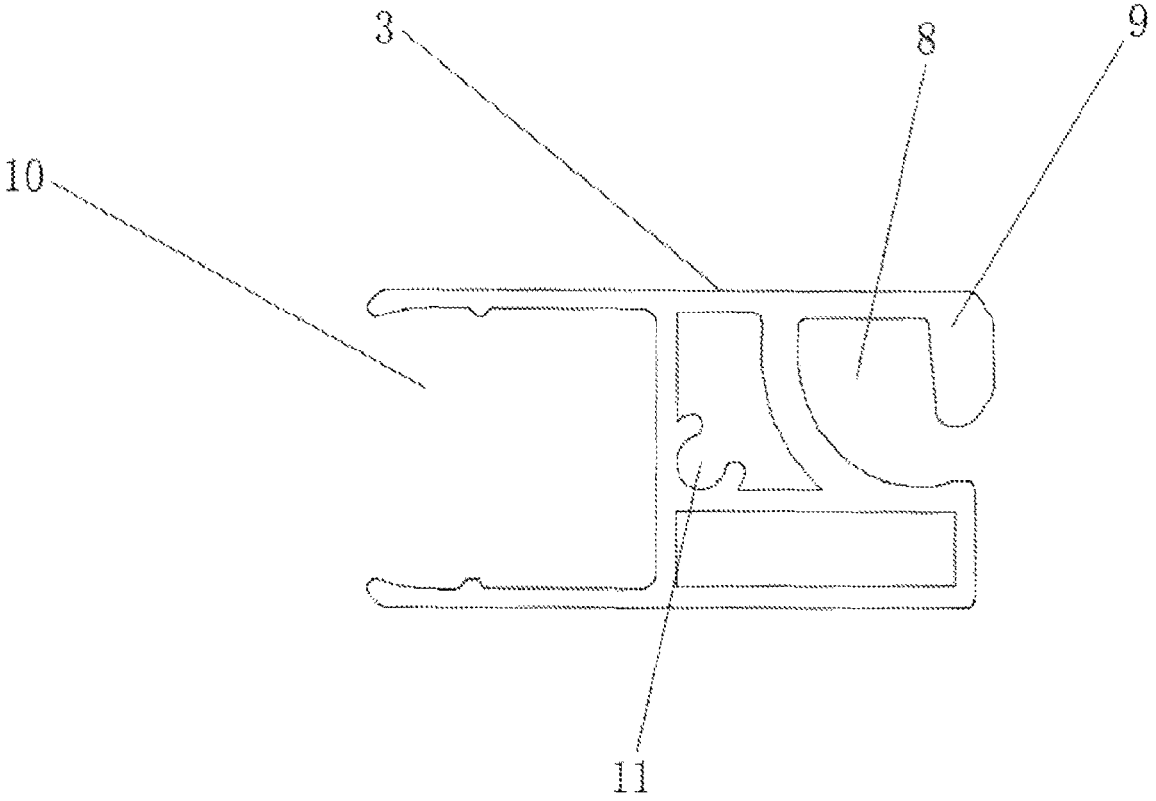
FIG. 4 is a partial structure section illustration of the pedestal in the invention.
Figure 5:
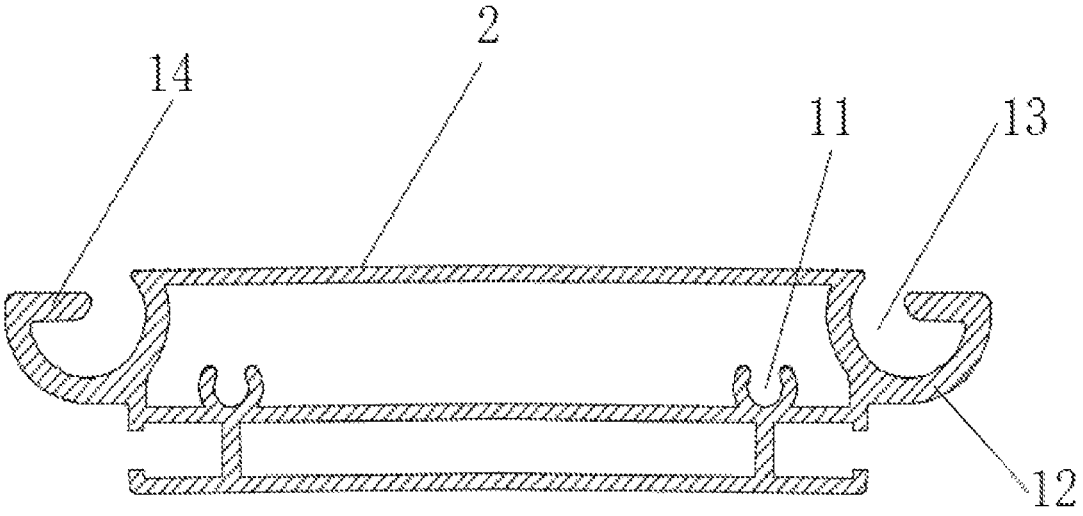
FIG. 5 is a partial structure section illustration of the connectors in the invention.
Figure 6:
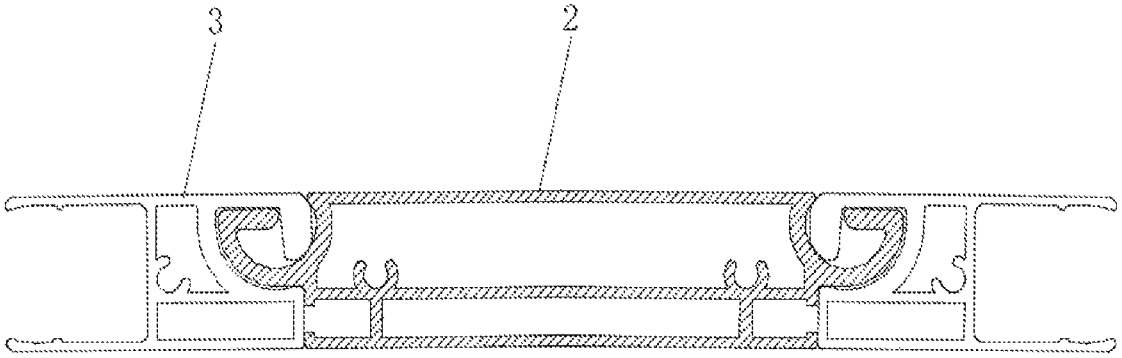
FIG. 6 is a partial structure section illustration about the combination of the pedestal and the connector in the invention.
Figure 7:
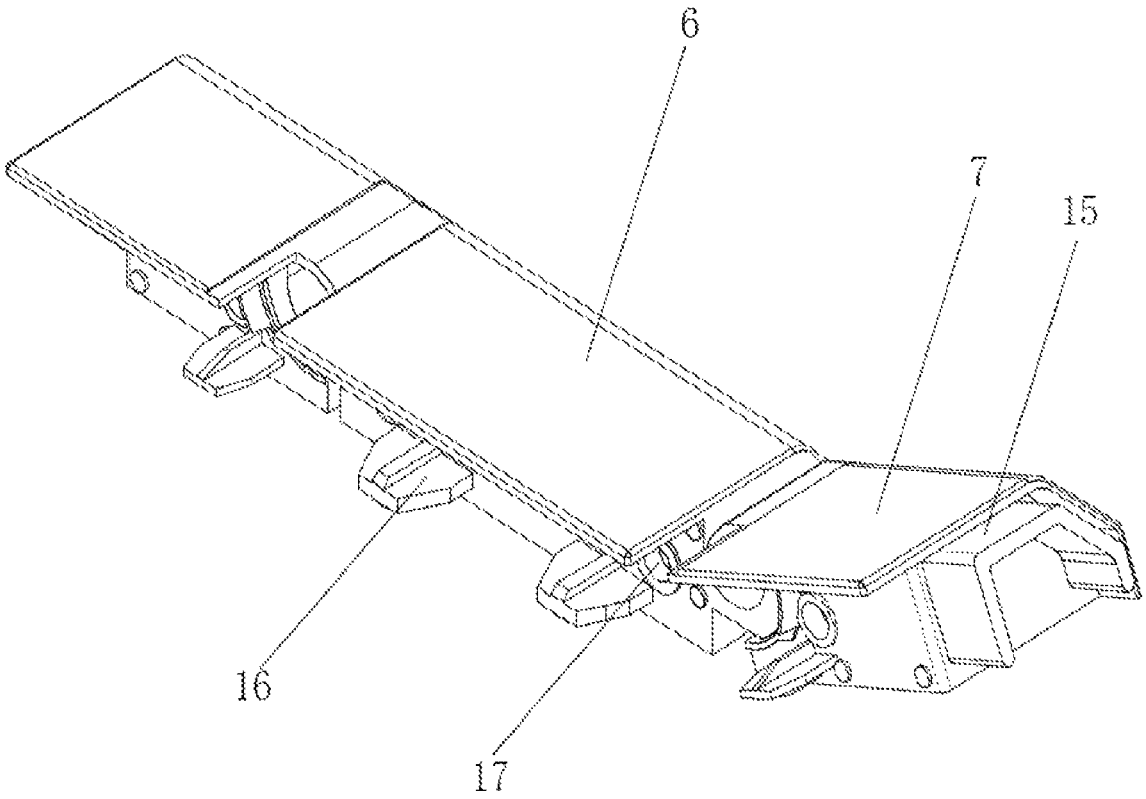
FIG. 7 is a partial structure illustration of the rotary shaft socket in the invention.
Figure 8:
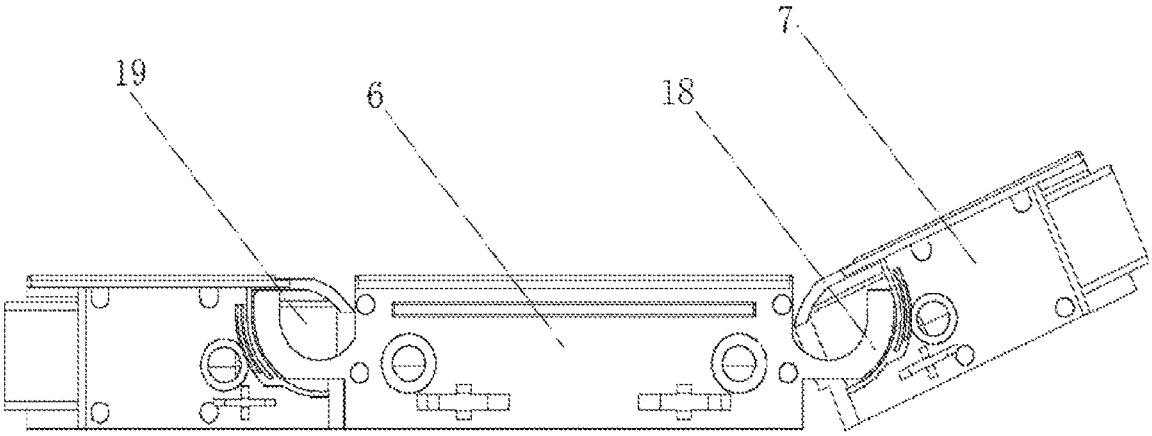
FIG. 8 is a partial structure side view of the rotary shaft socket in the invention.
Figure 9:
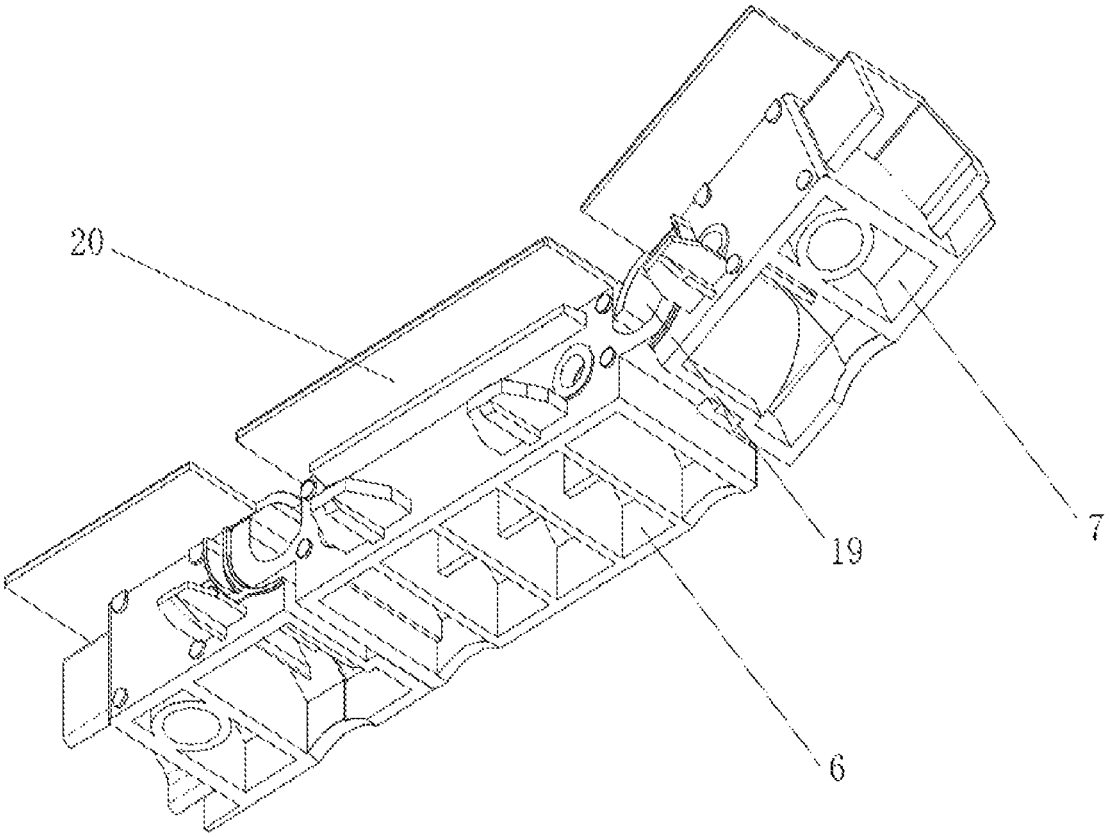
FIG. 9 a partial structure bottom view of the rotary shaft socket in the invention.
Figure 10:
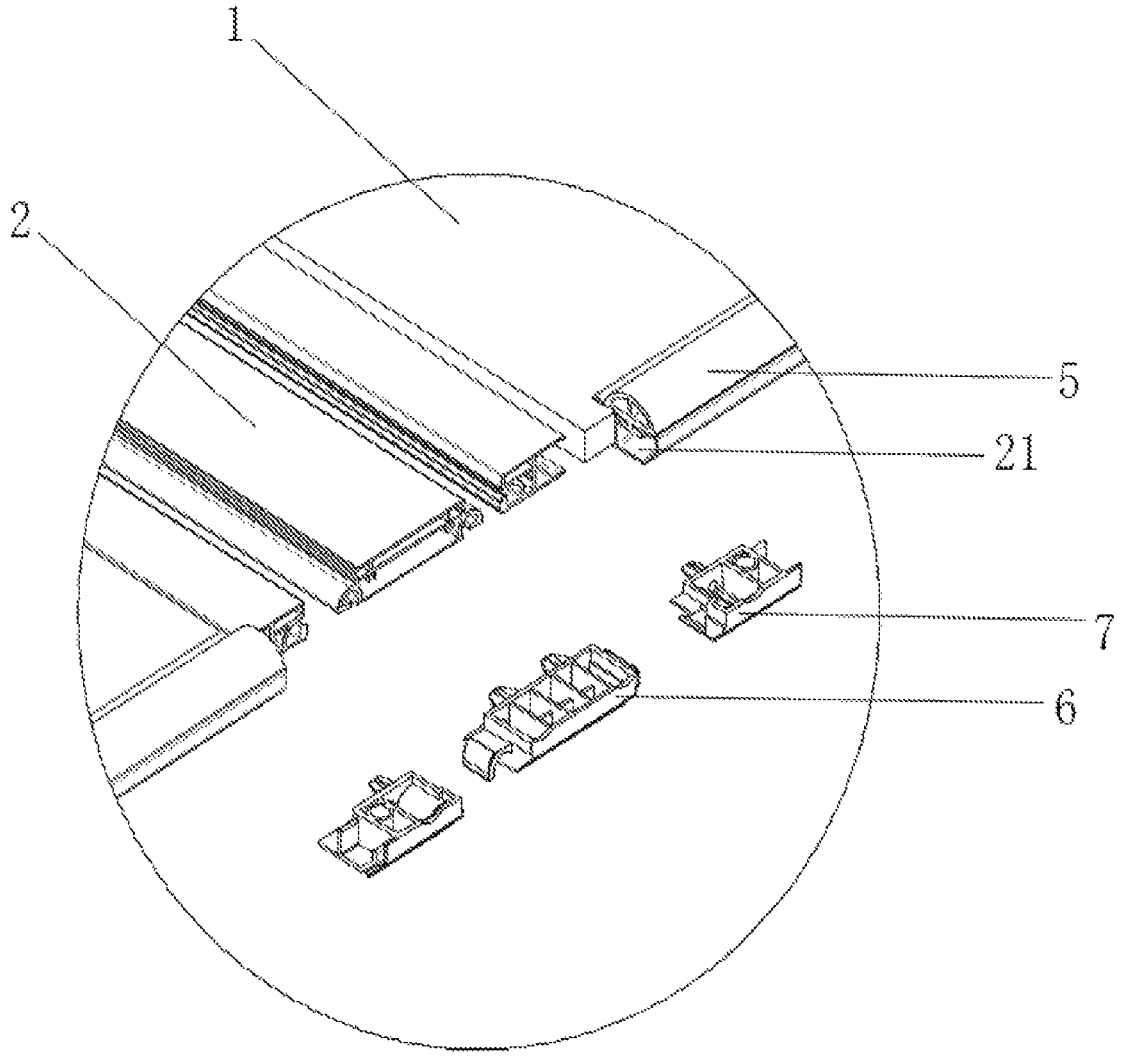
FIG. 10 is a partial structure decomposition illustration of socket in the rotating shaft of the invention.
Figure 11:
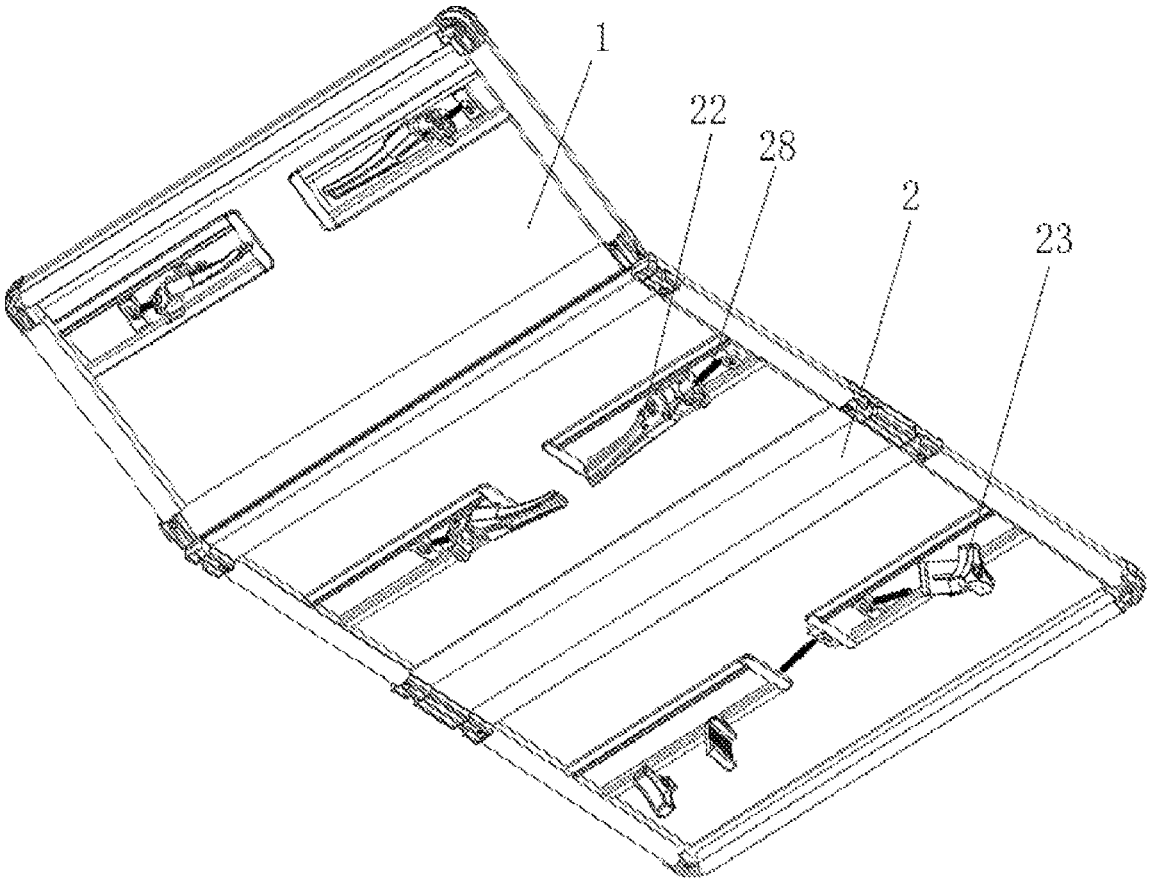
FIG. 11 is a partial structure bottom view of the plate in the invention.
Figure 12:
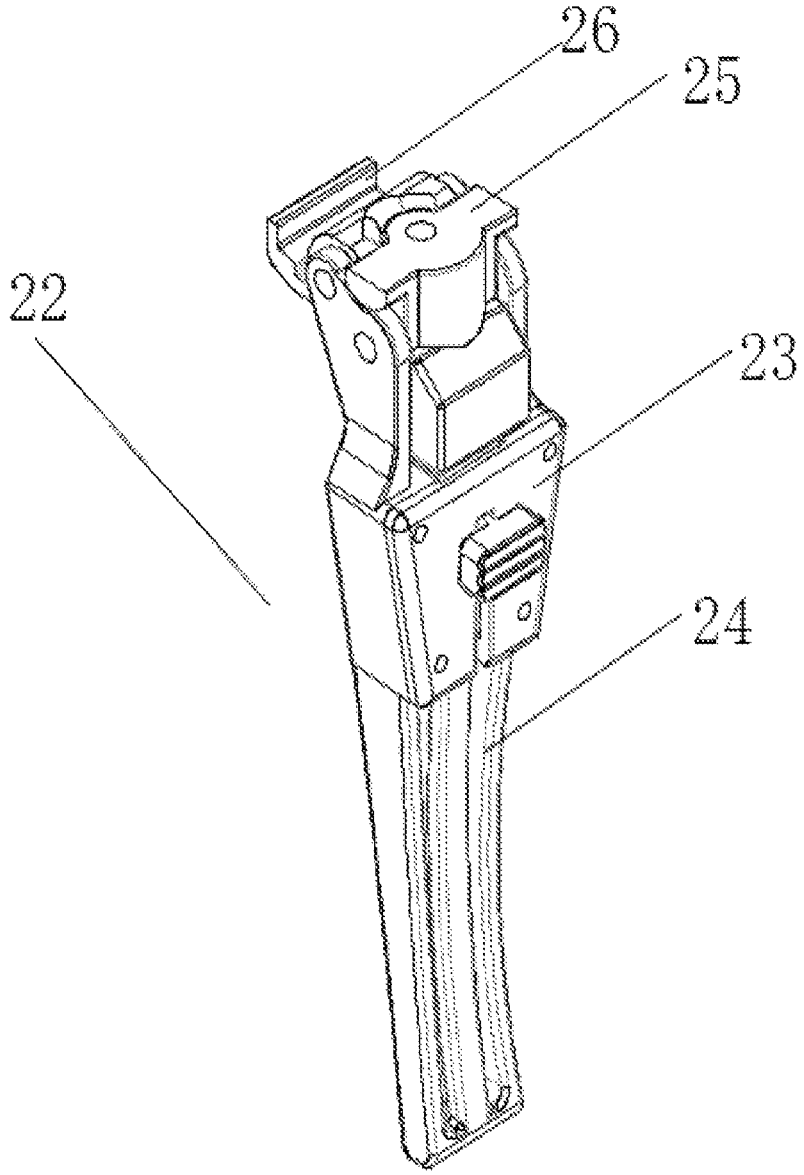
FIG. 12 is a partial structural illustration of the wrench in the invention.
Figure 13:
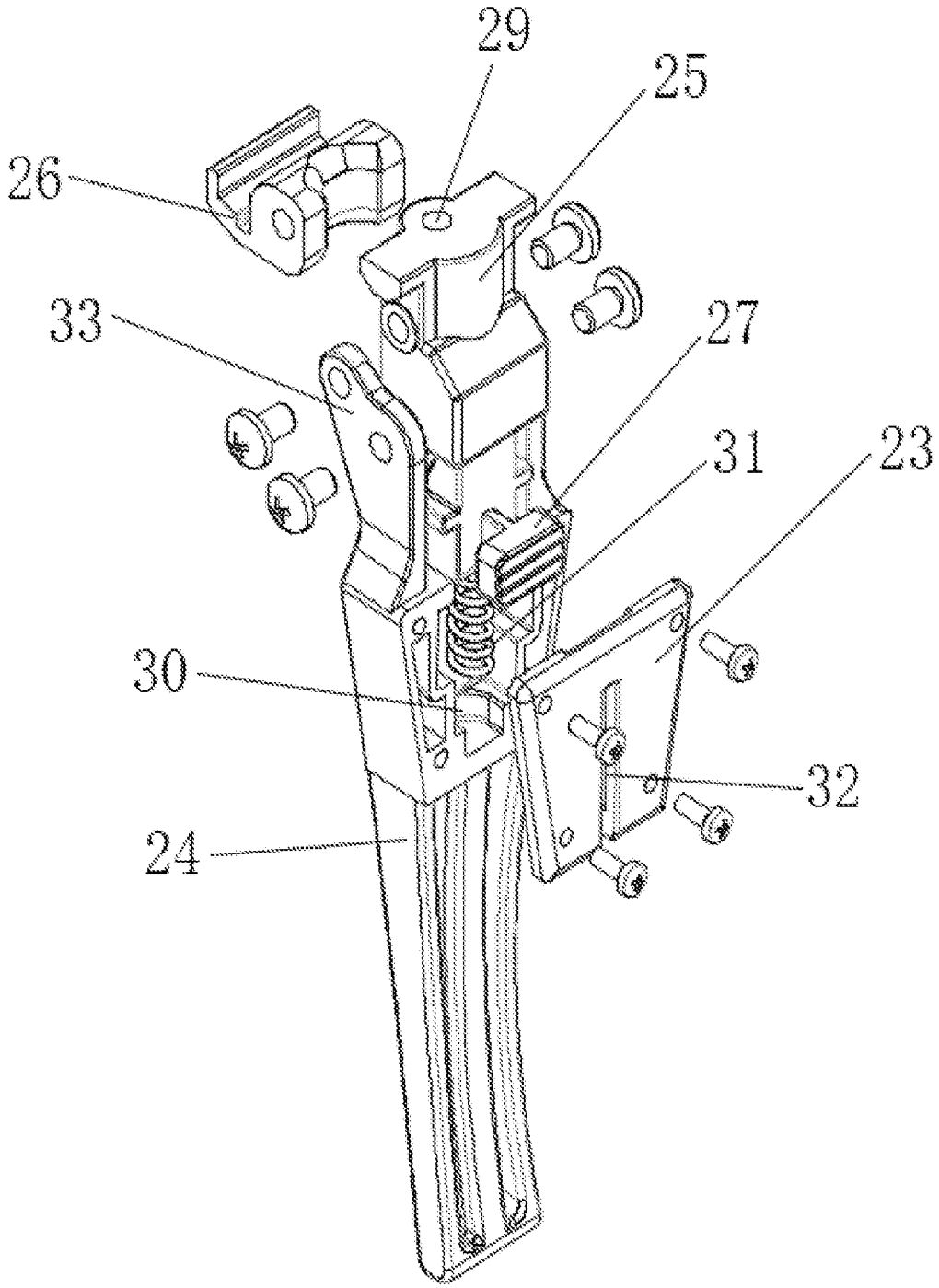
FIG. 13 is a partial structure decomposition illustration of the plate in the invention.

As is seen from FIG. 1 to 13, A kind of bed cover of pickup truck includes one bed cover. The plate of the bed cover include at least two plates 1. The adjacent plates are connected by rotating shaft structure. The rotating shaft structure includes a plate-like pedestal 2, two connectors 3 which form a rotary connection with the pedestal. There is a first rotating part 12 on both sides of the pedestal, the lower *inner* surface of which is [cambered] *concave*. There is a rotary groove 13 whose cross section is major arc shape in the above part of the first rotary part. And there exists the first stop bar 14 in the inner rotary groove which is close to the connectors. One side of the connectors is connected with the plates, and there is the first groove 8 which matches with the first rotating part in the another side of the connector. And there is the second stop bar 9 which is hook shape in the above part of the first groove. And there is the front part of the second stop bar in the rotary groove. y this design, this invention provide a kind of bed cover of pickup truck with simple structure. When the bed cover is in use and the water falls to the cover, it will penetrate into the rotary groove along the clearance between connectors and the pedestal. The rotary groove is like a drainage channel with great leading function. The rotating shaft structure can stop the water from penetrating into the bed cover of pickup truck, meanwhile the water can't penetrate into the inside part of pedestal in rotating shaft structure. Comparing with other drainage structures, the drainage channel in the invention are bigger and will not cause syphonage. Thus the leading function will be better, requirement of the assembly accuracy will be lower and the production will be easier. When used, the second stop bar rotates in the rotating slot. When turned to the maximum angle, the second stop bar will be blocked by the first stop bar and its further rotation will be restricted. The connector can rotate from 0° to 95° opposite the pedestal, while the two adjacent plates can rotate 0° to 190° opposite to each other. The rotating range is large. It is very convenient to open the bedcover of the pickup truck when used.

At least two of the plates are made of FRP Honeycomb Panel. The rotating shaft structure is made of plastic. The pedestal adopts hollow structure to reduce the cost and make it easier to produce.

In order to ensure the structural strength of the equipment, the pedestal and the first rotating part, the first rotating part and the first blocking strip all adopt the integrated structure. And the connectors and the second stop bar adopt the integrated structure. The bottom surface of the first groove is arc-shaped to match the lower surface of the first rotating part, which is more smooth when deflected.

One side of the connectors are provided with the first embedded slot 10. And the one side of the plate is embedded into the slot. So the above connector is is fixedly connected with the plates. The cross section of the first embedded slot is ⊏ shape. The cross section of the first embedded slot is ⊏ shape. And the first embedded slot is provided with at least two opposite first strip convex. The length direction of first convex is the same as that of the connector.

There are 3 plates in the bed cover of pickup truck. The 3 plates include the first plate, the second plate and the third plate. The first and the second plate are connected by the first rotating shaft structure. And the second and the third plate are connected by the second rotating shaft structure. The first rotating shaft structure [consists of] *comprises* the first pedestal. The second rotating shaft structure [consists of] *comprises* the second pedestal. And the width of first pedestal close to the pickup truck head is larger than that of second pedestal close to the rear of pickup truck. Thus it will be easy for the user to operate.

The sidebar 5 is set in the outside part of the plates to protect the side of the plates. And there is the second embedded slot for the plates set in one side of the sidebar. The first insert slot 21 is arranged on both ends of the sidebars. The cross section of the second embedded slot is in the shape of ⊏. The second embedded slot is provided with at least two opposite arranged second strip convex. And the length direction of the second strip convex is the same as the length direction of the sidebar. The sidebars are used to protect the sides of the plate and reduce the damage caused by collision on the side edges of the plate.

There is a corner socket 4 set in the corner of the plates to connect the adjacent sidebars. The two ends of the corner socket are provided with a first plug for inserting into the first insert slot to connect the sidebars and enhance the installation strength of the sidebar.

For example, the first plate, the second plate and the third plate in the bed cover are connected in turn. And the corner socket is set at the two corners of the front side of the first plate. The two corner sockets include the first corner socket and the second corner socket. The first sidebar is arranged on the left side of the first plate, the second sidebar is arranged on the front side of the first plate. And the third sidebar is arranged on the right side of the first plate. Thus the first sidebar will be connected with the second sidebar through the first corner socket, and the second sidebar will be connected with the third sidebar through the second corner socket. Similarly, there is a corner socket at both corners of the rear of the third plate.

There is a rotating shaft socket set in outside part of the rotating shaft structure to protect the structure. The rotating shaft socket contains one first socket 7 installed in the outside part of the pedestal and two second socket 6 installed in the connectors; There is the second rotating part 18 on both sides of the first socket. And the lower surface of the second rotating part is arc-shaped. The upper side of the second rotating part is provided with a drainage channel connected with the rotating groove; One side of the second socket is fixedly connected with the sidebar. And the another side of the second socket is provided with a second groove 19 matching the shape of the second rotating part. The second rotating part is arranged in the second groove. The water seeping into the rotating groove will flow into the drainage channel and quickly flow through the drainage channel. Thus The invention has better drainage performance.

With an opening on one side of the second groove as a drainage port, the width of the second groove is less than that of the second socket. The drainage outlet is then arranged on the inner side of the second socket. The drainage outlet which is with hidden form is arranged inside the second socket to avoid additional opening of water outlet and guarantee the overall beauty of the cover. A waterproof gasket is arranged below the first socket and the second socket and an opening is arranged on the waterproof gasket located below the drainage outlet.

The upper part of the first socket is provided with the first sheet-shaped convex to cover the pedestal. And the upper part of the second socket is provided with the second sheet-shaped convex to cover the connector. The outer part of the plate and the rotating shaft structure is covered by the sheet-shaped convex and the side bar thus achieving the waterproof effect.

The bottom surface of the second groove is arc-shaped to match the lower surface of the second rotating part. And the second rotating part is more smooth when deflected.

The second socket 15 for inserting into the first insert slot is arranged on one side of the second socket. And then one side of the second socket is fixedly connected with the sidebar to connect the sidebar and enhance the installation strength of the sidebar.

The second insert slot is arranged on the pedestal and the connector. And a third plugl 6 for inserting the second insert slot is arranged on the upper part of the first and second socket. A first thread bolt hole 11 is arranged on the pedestal and the connector. A second thread bolt hole 17 matching the position of the first thread bolt hole is arranged on the first and the second socket. Then the pedestal is fixed with the first socket, the connector part and the second socket by thread bolts. The first socket and the pedestal, the second socket and the connector are fixedly connected through plug insertion and bolt screw. Thus they are closely connected, achieve sealing and waterproof effect.

A wrench 22 is arranged below the plate. The wrench comprises a lower plate 24 and an upper plate 23 fixed to the lower plate. And the lower part of the lower plate works as a handle of the wrench. The upper part of the lower plate is provided with an installation groove 30. The upper plate is arranged outside the installation groove. A spring 31 and a bolt 27 are arranged in the installation groove. The bolt is arranged above the spring. The upper plate is provided with a clamp groove 32 for clamping the bolt. The upper part of the lower plate is provided with two connecting arms 33. A lifting block 25 and a hook 26 are arranged between the two connecting arms. A lifting block and a hook is arranged on one side of the lifting block. The lifting block is arranged above the bolt. The lifting block is provided with a thread hole 29 through which a threaded rod passes. One side of the thread rod 28 is arranged in the thread hole. The another side of the rod is fixed on the plate. The connecting arm and the lower plate adopt an integrated structure. The third bolt hole and the fourth bolt hole are arranged on the connecting arm. And the fifth bolt hole matching the position of the third bolt hole is arranged on the lifting block. The sixth bolt hole matching the position of the fourth bolt hole is arranged on the hook. Then the lifting blocks and hook are fixed between the two connecting arms respectively by bolts. The outer surface of the front side of the bolt which can be clipped into the groove is provided with anti-skid lines. And the anti-skid lines are arranged in strip convex with equal spacing. The third strip convex is arranged on both sides of the bolt. The third strip convex is against the inner side of the connecting arm so that the bolt can slide up and down between the two connecting arms with the lifting block. The wrench is made of metal. When the handle is rotated clockwise, the hook will move upward along the lifting block so that the groove part of the hook can be against the sidebar of the pickup truck body. And the bolt will be clamped into the groove on the upper plate to lock the lower plate and fix it; Press the bolt and draw it out from the groove. Then rotate the handle counterclockwise, the hook will move downward along the lifting block and make it easy to remove. The bed cover can also be connected to the sidebar of the car body through the buckle 23.

Finally, it should be noted that the above is only a preferred embodiment of the invention and is not used to limit the invention. Although the invention is described in detail with reference to the above embodiment, it is still possible for those skilled in the field to modify. Or they can do equivalent replacement of some of the technical features in it. Any modification, equivalent replacement, improvement etc. made within the spirit and principles of the invention shall be included in the scope of protection of the invention.

We claim:

1. A bed cover of pickup truck includes one bed cover; wherein said bed cover includes at least two plates; the adjacent plates are connected by rotating shaft structure;

the rotating shaft structure includes a plate-like pedestal, two connectors which form a rotary connection with the pedestal;

there is a first rotating part on both sides of the pedestal, the lower *inner* surface of which is [cambered] *concave*; there is a rotary groove whose cross section is major arc shape in [the] *an* above part of the first [rotary] *rotating* part; and there exists [the] *a* first stop bar in [the] *an* inner rotary groove which is close to the connectors;

one side of the connectors is connected with the plates, and there is [the] *a* first groove which matches with the first rotating part in [the] another side of the connector; and there is [the] *a* second stop bar which is hook shape in [the] *an* above part of the first groove; and there is [the] *a* front part of the second stop bar in the rotary groove.

2. The bed cover of pickup truck according to claim 1, wherein said one side of the connectors is provided with [the] *a* first embedded slot; and [the] one side of the plate is embedded into the *first embedded* slot;

the cross section of the first embedded slot is *squared-off* *C* (⊏) shape;

and the first embedded slot is provided with at least two opposite first strip convex; [the] *a* length direction of first convex is the same as that of the connector.

3. The bed cover of pickup truck according to claim 1, wherein there are 3 plates in the bed cover of pickup truck; the 3 plates include [the] *a* first plate, [the] *a* second plate and [the] *a* third plate; the first and the second plate are connected by [the] *a* first rotating shaft structure; and the second and the third plate are connected by [the] *a* second rotating shaft structure;

the first rotating shaft structure [consists of the] *comprises a* first pedestal; the second rotating shaft structure [consists of the] *comprises a* second pedestal; and [the] *a* width of first pedestal close to [the] *a head of* pickup truck [head] is larger than that of second pedestal close to [the] *a* rear of pickup truck.

4. The bed cover of pickup truck according to claim 1, wherein a sidebar is set in [the] *an* outside part of the plates to protect the side of the plates; and there is [the] *a* second embedded slot for the plates set in one side of the sidebar.

5. The bed cover of pickup truck according to claim 4, wherein [the] *a* first insert slot is set in both sides of the sidebar.

6. The bed cover of pickup truck according to claim 5, wherein there is a corner socket set in the corner of the plates to connect [the] adjacent sidebars; the two ends of the corner socket are provided with a first plug for inserting into the first insert slot.

7. The bed cover of pickup truck according to claim 1, wherein there is a rotating shaft socket set in outside part of the rotating shaft structure to protect the structure; the rotating shaft socket contains one first socket installed in the outside part of the pedestal and two second sockets installed in the connectors; there is [the] *a* second rotating part on both sides of the first socket; and the lower surface of the second rotating part is arc-shaped; [the] *an* upper side of the second rotating part is provided with a drainage channel connected with [the] *a* rotating groove; one side of the second socket is fixedly connected with [the] *a* sidebar; and the another side of the second socket is provided with a second groove matching the shape of the second rotating part; the second rotating part is arranged in the second groove.

8. The bed cover of pickup truck according to claim 7, wherein [the] *an* upper part of the first socket is provided with [the] *a* first sheet-shaped convex to cover the pedestal; and the upper part of the second socket is provided with [the] *a* second sheet-shaped convex to cover the connector.

9. The bed cover of pickup truck according to claim 7, wherein a wrench is arranged below the plate; the wrench comprises a lower plate and an upper plate fixed to the lower plate; and the lower part of the lower plate works as a handle of the wrench; [the] *an* upper part of the lower plate is provided with an installation groove; the upper plate is arranged outside the installation groove; a spring and a bolt are arranged in the installation groove; the bolt is arranged above the spring; the upper plate is provided with a clamp groove for clamping the bolt; the upper part of the lower plate is provided with two connecting arms; a lifting block and a hook are arranged between the two connecting arms; a lifting block and a hook is arranged on one side of the lifting block; the lifting block is arranged above the bolt; the lifting block is provided with a thread hole through which a threaded rod passes; one side of the thread rod is arranged in the thread hole; the another side of the rod is fixed on the plate.

10. The bed cover of pickup truck according to claim 7, wherein when the handle is rotated clockwise, the hook will move upward along the lifting block so that the groove part of the hook can be against the sidebar of the pickup truck body; and the bolt will be clamped into the groove on the upper plate to fix the bed cover to the pickup bed; press the bolt and draw it out from the groove; then rotate the handle counterclockwise, the hook will move downward along the lifting block to remove the cover of the pickup truck from the pickup [trick] *truck* bed.

* * * * *